US009879605B2

(12) United States Patent
Maurer et al.

(10) Patent No.: US 9,879,605 B2
(45) Date of Patent: Jan. 30, 2018

(54) COMBUSTOR COOLING STRUCTURE (71) Applicant: ANSALDO ENERGIA SWITZERLAND AG, Baden (CH)

(72) Inventors: Michael Thomas Maurer, Bad Säcklingen (DE); Ulrich Rathmann, Baden (CH); Holger Lübcke, Lörrach (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 394 days.

(21) Appl. No.: 14/742,806

(22) Filed: Jun. 18, 2015

(65) Prior Publication Data
US 2015/0377134 A1 Dec. 31, 2015

(30) Foreign Application Priority Data
Jun. 27, 2014 (EP) ..................................... 14174742

(51) Int. Cl.
F02C 1/00 (2006.01)
F02C 7/18 (2006.01)
(Continued)

(52) U.S. Cl.
CPC ................ F02C 7/18 (2013.01); F01D 9/023 (2013.01); F01D 25/12 (2013.01); F23R 3/002 (2013.01);
(Continued)

(58) Field of Classification Search
CPC . F01D 25/12; F01D 9/023; F02C 7/18; F05D 2260/201; F23R 2900/03041;
(Continued)

(56) References Cited

U.S. PATENT DOCUMENTS 4,872,312 A    10/1989  Iizuka et al.
5,363,654 A *  11/1994  Lee .......................... F23R 3/002
                                                            165/908
(Continued)

FOREIGN PATENT DOCUMENTS

CN    87101982 A    10/1987
CN    1157879 A      8/1997
(Continued)

OTHER PUBLICATIONS

Office Action (First Office Action) dated Sep. 27, 2017, by the State Intellectual Property Office (SIPO) of the People's Republic of China in corresponding Chinese Patent Application No. 201510360417.3, and an English Translation of the Office Action. (13 pages).

Primary Examiner — Jesse Bogue
(74) Attorney, Agent, or Firm — Buchanan Ingersoll & Rooney PC (57) ABSTRACT The invention relates to a transition piece assembly for a gas turbine. A transition piece having one end adapted for connection to a gas combustor and an opposite end adapted for connection to a first turbine stage. The transition piece having at least one external liner and at least one internal liner. The internal liner forms the hot gas flow channel. A first section of the transition piece assembly upstream of a first turbine stage has a plurality of cooling apertures. Cooling medium through the cooling apertures enters the plenum, which is created between external and internal liners and a cooling medium flows along at least the first section of the transition piece assembly. At least one second section upstream of the first section with respect to the hot gas flow has at least one additional air inlet system.

11 Claims, 5 Drawing Sheets (51) Int. Cl.
  *F01D 9/02* (2006.01)
  *F01D 25/12* (2006.01)
  *F23R 3/00* (2006.01)
  *F23R 3/04* (2006.01)
  *F23R 3/06* (2006.01)

(52) U.S. Cl.
  CPC ............. *F23R 3/005* (2013.01); *F23R 3/04* (2013.01); *F23R 3/06* (2013.01); *F05D 2260/201* (2013.01); *F23R 2900/03041* (2013.01); *F23R 2900/03042* (2013.01); *F23R 2900/03043* (2013.01); *F23R 2900/03044* (2013.01)

(58) Field of Classification Search
  CPC .. F23R 2900/03042; F23R 2900/03043; F23R 2900/03044; F23R 3/002; F23R 3/005; F23R 3/04; F23R 3/06
  See application file for complete search history.

(56) References Cited

U.S. PATENT DOCUMENTS

| | | | |
|---|---|---|---|
| 5,467,815 A * | 11/1995 | Haumann | F01P 1/02 165/109.1 |
| 5,802,841 A | 9/1998 | Maeda | |
| 6,018,950 A * | 2/2000 | Moeller | F01D 9/023 29/889.2 |
| 6,341,485 B1 * | 1/2002 | Liebe | F23R 3/002 60/760 |
| 7,089,741 B2 * | 8/2006 | Ikeda | F23R 3/002 60/725 |
| 8,276,391 B2 | 10/2012 | Berry et al. | |
| 2006/0283189 A1 | 12/2006 | Lipinski et al. | |
| 2010/0031665 A1 | 2/2010 | Chokshi et al. | |
| 2011/0252805 A1 | 10/2011 | Berry et al. | |
| 2012/0121408 A1 * | 5/2012 | Lee | F01D 9/023 415/214.1 |
| 2014/0109577 A1 | 4/2014 | Lee et al. | |
| 2014/0260279 A1 * | 9/2014 | DiCintio | F23R 3/005 60/752 |

FOREIGN PATENT DOCUMENTS

| | | |
|---|---|---|
| CN | 102242934 A | 11/2011 |
| DE | 103 12 971 A1 | 12/2004 |
| EP | 0 239 020 A2 | 3/1987 |
| EP | 0 321 809 A1 | 6/1989 |
| EP | 0 620 362 A1 | 10/1994 |
| EP | 0 704 657 A2 | 4/1996 |
| EP | 1 426 558 A2 | 6/2004 |
| EP | 2 148 139 A2 | 1/2010 |
| EP | 2 230 456 A2 | 9/2010 |
| EP | 2 378 200 A2 | 10/2011 |
| JP | H0941991 A | 2/1997 |

* cited by examiner

COMBUSTOR COOLING STRUCTURE

CROSS-REFERENCE TO RELATED APPLICATIONS

This application claims priority to European application 14174742.8 filed Jun. 27, 2014, the contents of which are hereby incorporated in its entirety.

TECHNICAL FIELD

The present invention relates to an internally cooled combustor turbine liner for a rotary machine, preferably a gas turbine engine.

The invention refers fundamentally to a sequential liner of a combustor of a gas turbine, comprising an impingement cooling zone, a sequential disposed liner having at least one cooling arrangement, according to the preamble of claim 1.

BACKGROUND

It is known practice for selected gas turbine engine components, especially in the combustor turbine interface, to be internally air cooled by a supply of air bleed from a compressor off-take. Such cooling is necessary to maintain combustor component temperatures within the working range of the materials from which they are constructed.

Figure 1:
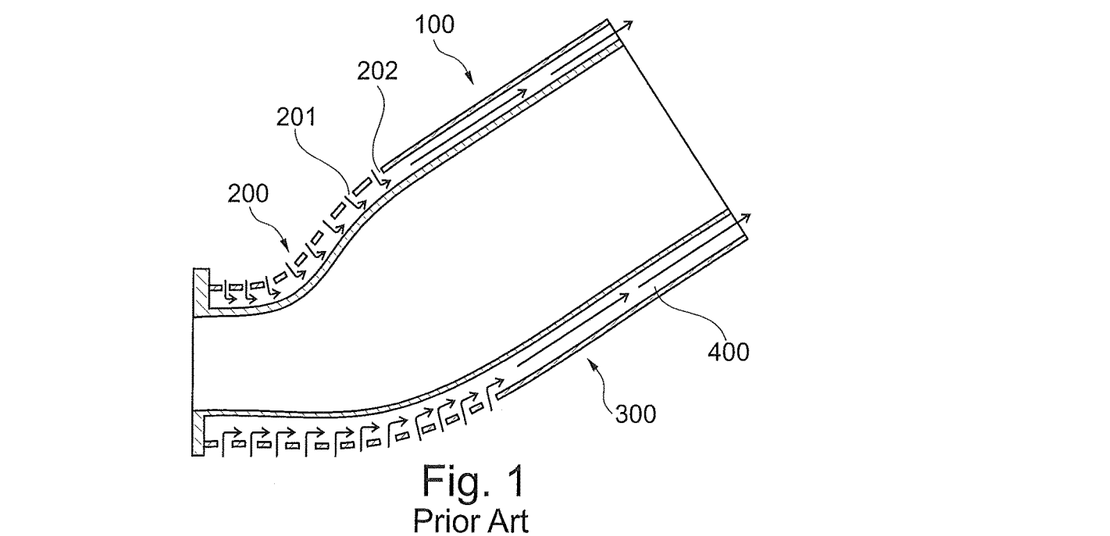
FIG. 1 shows a schematic representation of a transition piece according to state of the art.
Figure 2:
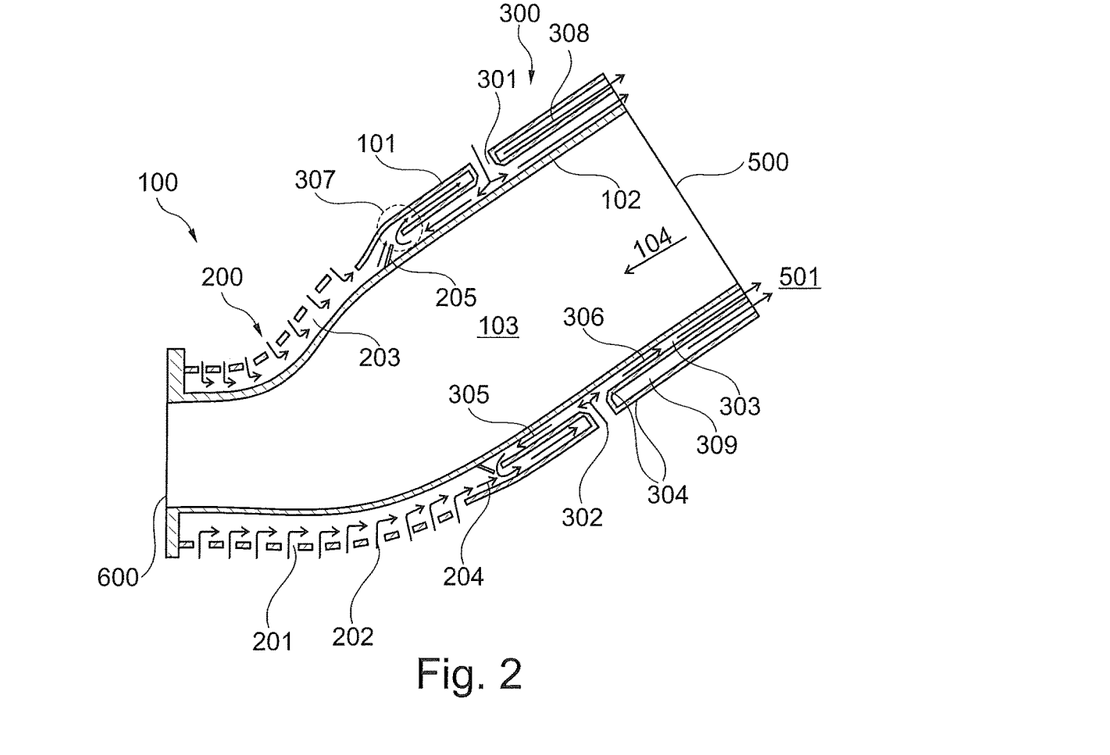
FIG. 2 shows a sectional view along a transition piece comprising a cooling air system having a first impingement cooling and a subsequent convective cooling.

With reference to EP 2 230 456 A2, especially to FIG. 1 and FIG. 2 of that document, a typical gas turbine includes a transition piece by which the hot combustion gases from an upstream combustor as represented by the combustor liner are passed to the first stage of a turbine represented at item 14 in EP 2 230 456 A1. Flow from the gas turbine compressor exits an axial diffuser and enters into a compressor discharge case. About 50% of the compressor discharge air passes through apertures formed along and about a transition piece impingement sleeve for flow in an annular region or annulus (or, second flow annulus) between the transition piece and the radially outer transition piece impingement sleeve. The remaining approximately 50% of the compressor discharge flow passes into flow sleeve holes of an upstream combustion liner cooling sleeve (not shown) and into an annulus between the cooling sleeve and the liner and eventually mixes with the air in annulus. This combined air eventually mixes with the gas turbine fuel in a combustion chamber.

With reference to EP 1 426 558 A2 a transition piece assembly includes a transition piece and a surrounding impingement flow sleeve attached to the turbine end of the liner.

The impingement flow sleeve that is formed with a plurality of impingement cooling apertures by which compression cooling air enters the plenum created between the impingement flow sleeve and the outer surface of the transition piece to interact with the dimples on the cold side surface thereof. Thus, the flow sleeve assures that the convection cooling air is directed as desired along the transition piece from the turbine end to the combustor liner end, over the dimpled surface, increasing the heat transfer coefficients and reducing the temperature of the transition piece.

Generally, prior art sequential liner cooling concepts feature a backside cooled wall incorporating impingement cooling. Other cooling schemes utilize a certain length where the sequential liner is cooled with convective cooling techniques, for example smooth, rough or turbulated walls. Usually, the first impingement rows without any cross-flow in the cooling channel are located towards the turbine interface.

The mass flow of the single impingements jets are defined by the local driving pressure drop. The cooling mass flow is fed from the compressor exit. The impingement cooled section is then followed by convective cooling techniques. As a result the pressure drop of such a system is always an addition of the single pressure drop contributors.

Generally, higher engine gas temperature have led to increased cooling bleed requirements resulting in reduced cycle efficiency and increased emission levels. To date, it has been possible to improve the design of cooling systems to minimize cooling flow at relative low cost. In future engine temperatures will increase to levels at which it is necessary to have complex cooling features to maintain low cooling flows.

Additionally, referring to known solutions to lower the sequential liner pressure drop is to use essentially effusion cooling techniques, in the way that the cooling system is parallel to the combustion system. Drawback is the increased leakage into the combustion system, which is associated with higher emissions.

U.S. Pat. No. 5,802,841 A discloses a transition piece having one end adapted for connection to a gas combustor and an opposite end adapted for connection to a first turbine stage. Said transition piece having at least one external liner and at least one internal liner and the internal liner forms the hot gas flow channel. The first section of the transition piece assembly upstream of a first turbine stage having a plurality of cooling apertures. Cooling medium through the cooling apertures enters the plenum which is created between external and internal liners and a cooling medium flows along at least the first section of the transition piece assembly. At least one second section upstream of the first section with respect to the hot gas flow having at least one additional air inlet system. The additional air inlet system of the second section (FC) is designed in the manner that the cooling medium is discharged into at least one air plenum created between external and internal liners in different direction with respect to the hot gas flow in two different directions, namely an upstream and downstream one.

More pertinent material is evident from the following documents:

EP 2 378 200 A2; EP 2 148 139 A2; EP 0 239 020 A2; US 2006/283189 A1; JP H09 41991 A; US 2014/109577 A1.

SUMMARY

It is an object of the invention to reduce the needed pressure drop for cooling scheme of the entire sequential liner. This is done by introducing an inventive routing of sequential liner cooling air. Realizing this concept has the ability at least to halve the needed pressure drop compared to prior art solutions.

To circumference the disadvantage according to the above mentioned state of the art a parallel cooling concept is proposed.

In such a way the individual pressure drop do not add up. Instead, the overall pressure drop is given by the main contributor. Therefore, the potential to reduce the overall pressure drop is conceivable.

Accordingly, the basic idea of the invention is preferentially to provide a very efficient cooling solution of the proposed louver cooling solution as a certain heat pick-up of the coolant can be accounted to lower the leakage penalty caused by state of the art purge concepts.

The present invention proposes a transition piece assembly for a gas turbine comprising a transition piece having one end adapted for connection to a gas combustor and an opposite end adapted for connection to a first turbine stage. Said transition piece having at least one external liner and at least one internal liner forming the hot gas flow channel. A first section of the exterior liner upstream of the first turbine stage having a plurality of cooling apertures. A cooling medium through the cooling apertures enters the plenum created between external and internal liners and the cooling medium flows along the transition piece. At least one second section upstream of the first portion with respect to the hot gas flow having at least one additional air inlet system. The additional air inlet system of the second section, which comprises at least one internal air plenum and at least one external air plenum, is designed in the manner that the cooling medium is distributed into the plenum created between external and internal liners in two different directions with respect to the hot gas flownamely one downstream direction towards the turbine and one upstream direction toward the combustor, wherein a portion of the cooling medium flows downstream in the direction of a first stage of the turbine, and the remaining portion of the cooling medium flows upstream in the direction of a combustor plenum. It is characterized in that the cooling medium portion is mixed with a cooling medium flow coming from the first section and the cooling medium mass out of that is directed via external air plenum to the combustor plenum.

Additionally, such cooling interface cooling concepts allows also manufacturing friendly design solutions as complex feeding systems of such louver cooling systems can be avoided.

This must be seen in the context that higher engine gas temperature have led to increased cooling bleed requirements resulting in reduced cycle efficiency and increased emission levels.

The proposed basic-solution offers a high pressure drop reduction potential by using existing, well-known manufacturing techniques, namely welding and metal sheet forming. Compared to the more complex advanced cooling methods, namely 3D turbulators done with SLM (Selective Laser Melting), LMF (Laser Metal Forming) or precision casting, the complexity of the proposed design is relatively low.

Another advantage of the present invention consists in the fact that a second air inlet is located upstream in the hot direction. This second air inlet system has the following features and advantages arising therefrom: The second air inlet system is made of pipes with a fillet or chamfer at the air outlet region and the pipes guide the compressor discharge air into the convective cooling system. Subsequently, the mentioned air cooling flow from the upstream acting impingement region is bypassed towards the combustion plenum.

Another advantage of the present invention consists in the fact that the air inlet system consists of one or more rows of inlet pipes evenly distributed or with different distances or different diameters or cross sections for optimized various inlet conditions, whereby the second air inlet system feeds a convective cooling channel with an upstream and a downstream portion. In this context, the upstream portion with respect to the hot gas flow joins the air stream from the bypass section at the combustor plenum, and the downstream portion with respect to the hot gas flow joins the air stream from the bypass section at the beginning of the bypass system.

Another advantage of the present invention consists in the fact that various design are introduce with the final purpose to optimize mixing system, namely: The bypass cooling stream is shielded of the mixing holes via a metal sheet. The mixing holes are arranged in two rows featuring long holes and the preferred arrangement of the mixing holes is staggered.

Another major advantage of the second zone cooling technique is that it allows a highly integrable mechanical junction, in case the combustor liner is built from two mains parts, e.g. combustor liner followed by a sequential liner. This means that the first zone of the cooling section is covering the sequential liner attached to the turbine interface, while the second zone of the cooling section is covering the combustor liner upstream in the hot gas direction.

The coolant feeding the interface cooling system, e.g. seal/finger spring with subsequent louver cooling is provided by the downstream branch in hot direction of the second zone cooling system. This provides a very efficient cooling solution of such louver cooling system as a certain heat pick-up of the coolant can be accounted to lower the leakage penalty caused by state of the art purge concepts. Such cooling interface concept allows also manufacturing friendly design solutions as complex system of louver cooling systems can be avoided.

Generally, both design solutions follow the general philosophy to have an upstream and a downstream portion of the parallel cooling flow to maximize the pressure drop reduction potential.

The focussed sequential liner is part of a gas turbine comprises essentially at least one compressor a first combustor which is connected downstream to the compressor. The hot gases of the first combustor are admitted at least to an intermediate turbine or directly or indirectly to a second combustor. The hot gases of the second combustor are admitted to a further turbine or directly or indirectly to an energy recovery, for example to a steam generator.

A can-architecture is also given, when an annular first and/or second combustion chamber having or comprising to each burner in flow direction an independent can or a separating flow combustion area which is wall-isolated from each other of the adjacent combustion areas.

It is also possible that at least one combustor runs under a caloric combustion path having a can-architecture, and wherein the air ratio ($\lambda$) of the combustion at least of the second combustor is kept below a maximum air ratio ($\lambda_{max}$). Accordingly, the first and/or second combustor is designed as a can-architecture, while the remaining combustor or both combustors can be designed as an annular combustion chamber.

Moreover, in the conventional concept all can combustors are intended to run at the same firing temperatures and therefore (assuming similar air distribution, and leakage status) at the same CO emissions. This is in general not valid due to misdistribution of flows between the cans, manufacturing tolerances, etc. In order to make CO reduction the most effective preferable those can combustors shall be turned off, which show the lowest temperature at the second combustor inlet, since those combustors are expected to show larger CO emissions, compared to the other burners. This more advanced setup is expected to result in even lower CO emissions, while the gas turbine operation concept and fuel distribution system gets more complicated.

The basic idea of this invention reducing the needed pressure drop for cooling scheme of the entire sequential liner can be utilized to work for a transition piece of a combustor of a gas turbine, which runs under sequential combustion (with or without a high pressure turbine) in a can-architecture, but not only.

Referring to a sequential combustion the combination of combustors can be disposed as follows:

At least one combustor is configured as a can-architecture, with at least one operating turbine.

Both, the first and second combustors are configured as sequential can-can architecture, with at least one operating turbine.

The first combustor is configured as an annular combustion chamber and the second combustor is built-on as a can configuration, with at least one operating turbine.

The first combustor is configured as a can-architecture and the second combustor is configured as an annular combustion chamber, with at least one operating turbine.

Both, the first and second combustor are configured as annular combustion chambers, with at least one operating turbine.

Both, the first and second combustor are configured as annular combustion chambers, with an intermediate operating turbine.

If premix burners for the combustor of the gas turbine are provided, these should preferably be formed by the combustion process and objects according to the documents EP 0 321 809 A1 and/or EP 0 704 657 A2, wherein these documents forming integral parts of the present description.

In particular, said premix burners can be operated with liquid and/or gaseous fuels of all kinds. Thus, it is readily possible to provide different fuels within the individual cans. This means also that a premix burner can also be operated simultaneously with different fuels.

The second or subsequent combustor can is preferably carried out by EP 0 620 362 A1 or DE 103 12 971 A1, wherein these documents forming integral parts of the present description.

Additionally, the following mentioned documents forming also integral parts of the present description:

EP 0 321 809 A1 relating to a burner consisting of hollow part-cone bodies making up a complete body, having tangential air inlet slots and feed channels for gaseous and liquid fuels, wherein in that the center axes of the hollow part-cone bodies have a cone angle increasing in the direction of flow and run in the longitudinal direction at a mutual offset. A fuel nozzle, which fuel injection is located in the middle of the connecting line of the mutually offset center axes of the part-cone bodies, is placed at the burner head in the conical interior formed by the part-cone bodies.

EP 0 704 657 A2, relating to a burner arrangement for a heat generator, substantially consisting of a swirl generator, substantially according to EP 0 321 809 A1, for a combustion air flow and means for injection of fuel, as well of a mixing path provided downstream of said swirl generator, wherein said mixing path comprises transaction ducts extending within a first part of the path in the flow direction for transferring a flow formed in said swirl generator into the cross-section of flow of said mixing path, that joins downstream of said transition ducts.

BRIEF DESCRIPTION OF THE DRAWINGS

The invention shall subsequently be explained in more detail based on exemplary embodiments in conjunction with the drawing. In the drawing.

DETAILED DESCRIPTION

FIG. 1 shows a transition piece assembly 100 of a combustor of a gas turbine according to state of the art. The showed transition piece comprising an impingement cooling zone or section 200, which is provided with impingement cooling holes 201. The sequential disposed section 300 comprising a convective cooling channel structure 400.

Generally, an advantageous impingement cooling comprising a baffle cooling for wall parts, in which, firstly, the flow-off of the cooling medium transversely to the jet direction does not impair the jet effect. This is achieved by means of a multiplicity of baffle tubes which are arranged with their inlet over an area on a plane or curved carrier and which are directed with their outlet towards the wall part to be cooled, the carrier being arranged at a distance from the wall part. Secondly, through the axial inflow of the cooling medium in this zone is achieved that the baffle jets deflected after the impact can now flow off unimpeded in the free interspace between the baffle-tube outlet and the carrier located at a distance corresponding to the length of the baffle tubes.

FIG. 2 shows a transition piece assembly for a gas turbine comprising a transition piece 100 having one end 500 adapted for connection to a gas combustor and an opposite end 600 adapted for connection to a first turbine stage. Said transition piece having at least one external liner 101 and at least one internal liner 102 forming the hot gas flow channel 103. A first section 200 of the exterior liner upstream of the first turbine stage 600 having a plurality of cooling apertures 201. The cooling medium, namely cooling air, flows through the cooling apertures 201, enters the plenum 203 created between external and internal liners 101/102, and the cooling air 202 is directed to the adjacent disposed convective cooling section 300. This convective cooling section is disposed, with respect to the hot gas flow 104, upstream of the impingement cooling section 200. The convective cooling section 300 having an additional air inlet system 301 for introducing an additional cooling air 302 directly to a first air plenum 303 created between a double-walled external liner 304 and the original internal liners 102, wherein the double-walled external liner 304 forms a second mixing air plenum 309.

From this air inlet system 301 a portion the cooling air 302 flows downstream 305 in the direction of the turbine 600, and the remaining portion flows upstream 306 in the direction of the combustor 500. The air cooling flow 204 from the impingement section 200 is bypassed along the double-walled external liner 304 towards the combustion plenum 501. The bypass-system of the impingement air flow 204 with respect to the cooling air flow 305 forms a mixing zone 307 providing a mixing air 308, and the bypass-system is made of pipes with a fillet or chamfer 205 at the outlet region of the impingement section 200. The mixing air 308 is directed to the combustor plenum 501.

The advantages of the present provisions are to be seen inter alia in that, now, an intensive cooling with the smallest possible quantity of cooling medium and with a low pressure drop is achieved. This in turn, if necessary, affords the possibility of implementing the classic baffle film arrangements with an enlarged film area. The film hole rows can then, in the case of flow-round components, be arranged at the locations having a lower external pressure.

Figure 3:
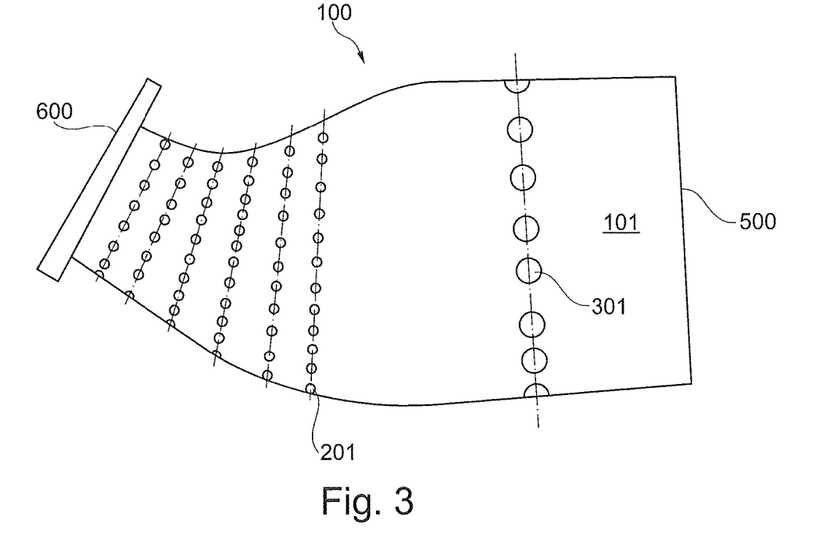
FIG. 3 shows a schematic representation of a transition piece comprising a cooling air system having one row of inlet pipes distributed along the convective cooling portion.

FIG. 3 shows a transition piece 100 according to the FIG. 2. The air inlet system 301 consists of one row of inlet passage pipes evenly distributed among one another and with identical or different diameters or cross sections for optimized various inlet conditions.

Figure 4:
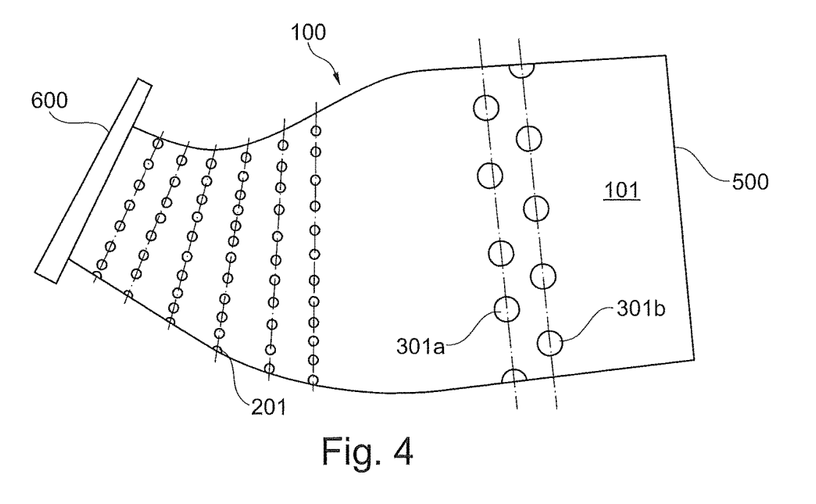
FIG. 4 shows a schematic representation of a transition piece comprising a cooling air system having two rows of inlet pipes distributed along the convective cooling portion.

FIG. 4 shows a transition piece 100 according to the FIG. 2. The air inlet system 301 consists of two rows of inlet passage pipes evenly distributed among one another and with identical or different diameters or cross sections for optimized various inlet conditions.

Figure 5:
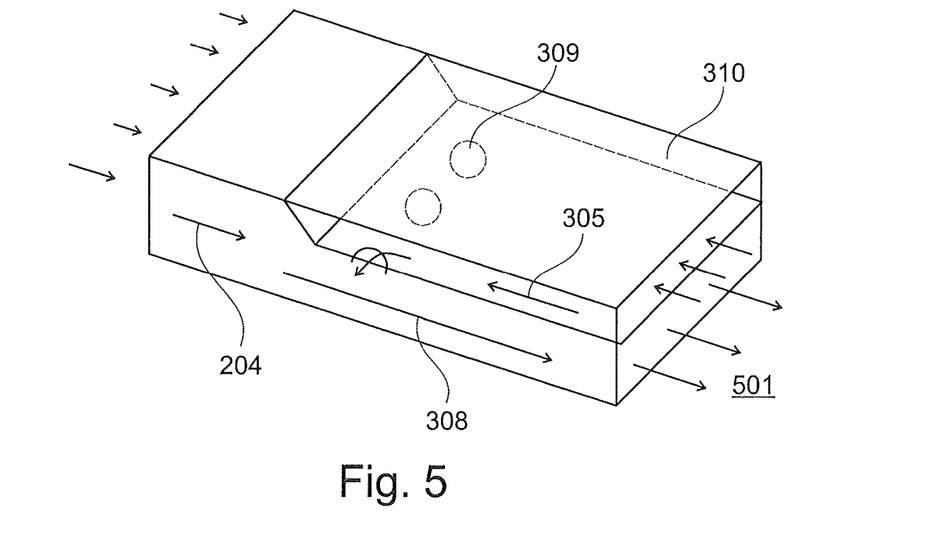
FIG. 5 shows a schematic representation of a downstream portion with respect to the hot gas flow joins the air stream from the bypass section at the beginning of the bypass system.
Figure 6:
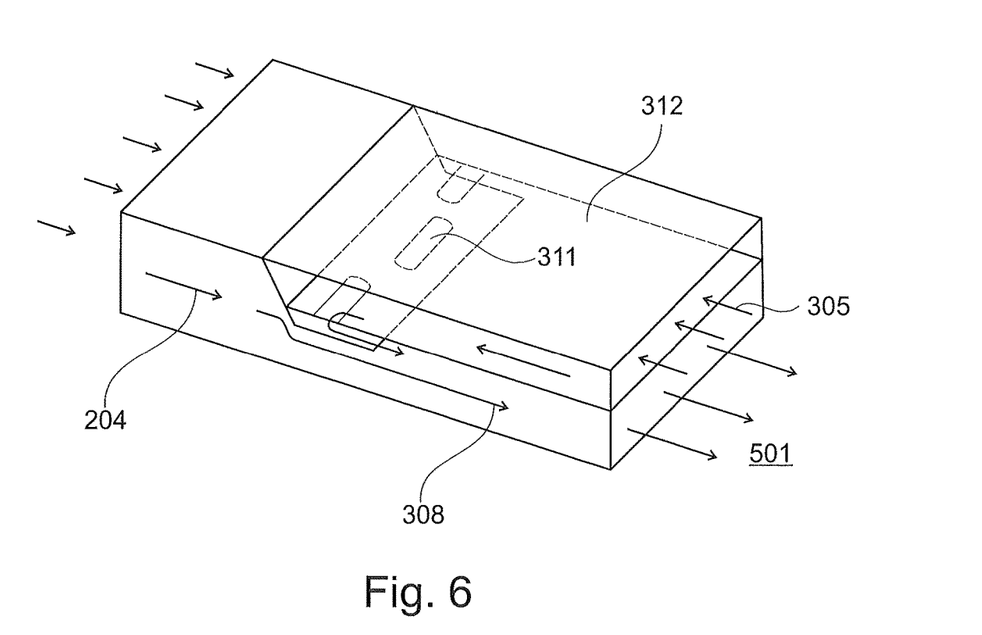
FIG. 6 shows a further schematic representation of a downstream portion with respect to the hot gas flow joins the air stream from the bypass section at the beginning of the bypass system.

FIGS. 5 and 6 show a further mixing system, fundamentally in accordance with the system of FIG. 2. With respect to pressure optimized air mixing of the downstream portion and the bypass cooling stream (see FIG. 2) further optimized mixing design are proposed. Details of the optimized air mixing system are:

The bypass air cooling stream is shielded of the mixing apertures or holes 309, 311 via a metal sheet 310, 312. The mixing holes 311 according to FIG. 6 are arranged in two rows featuring long or oval cross section. The preferred arrangement of the mixing apertures or holes 309, 311 are staggered.

Figure 7:
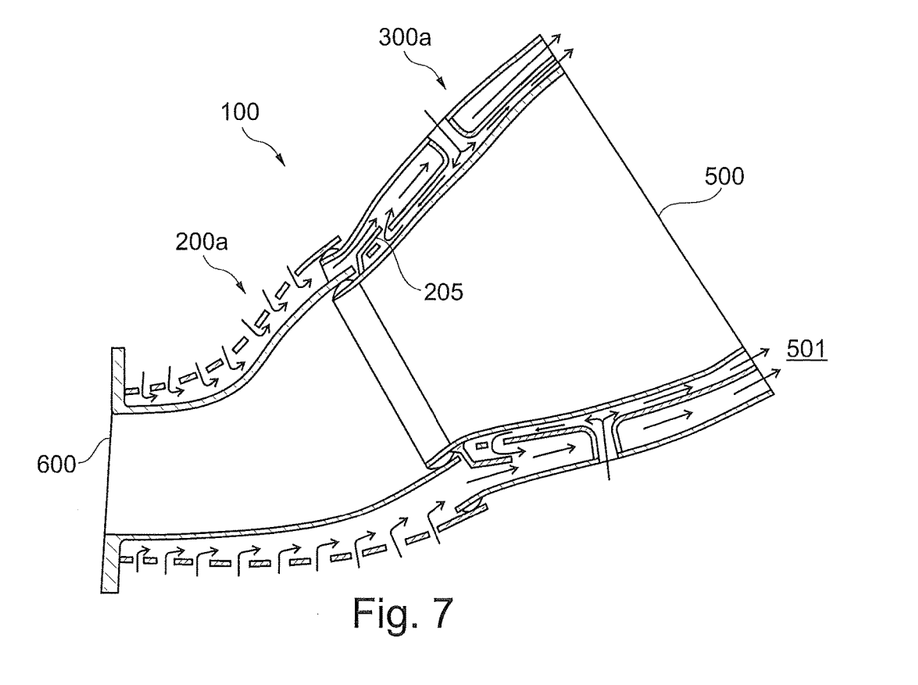
FIG. 7 shows a schematic representation of a transition piece comprising a cooling air system having an impingement cooling system and a superimposed convective cooling system.

FIG. 7 shows a transition piece 100 with a structure similar to FIG. 2, with the difference that the transition piece 100 is built from two main parts 200*a*, 300*a*. The transition piece 100 having one end 500 adapted for connection to a gas combustor and an opposite end 600 adapted for connection to a first turbine stage. Said transition piece having at least one external liner and at least one internal liner forming the hot gas flow channel. A first section 200*a* of the exterior liner upstream of the first turbine stage 600 having a plurality of cooling apertures or holes. The cooling medium, namely cooling air, flows through the cooling apertures enters the plenum created between external and internal liners, and the cooling air is directed to the adjacent disposed convective cooling section 300*a*. This convective cooling section is disposed, with respect to the hot gas flow, upstream of the impingement cooling section 200*a*. The convective cooling section 300*a* having an additional air inlet system for introducing an additional cooling air directly to a further plenum created between a double-walled external liner and the original internal liners (referring to the missing items see FIG. 2).

From this air inlet system a portion the cooling air flows downstream in the direction of the turbine, and the remaining portion flows upstream in the direction of the combustor. The air cooling flow from the impingement section is bypassed along the double-walled external liner towards the combustion plenum 501. The bypass-system of the impingement air flow with respect to the cooling air flow forms a mixing zone providing a mixing air, and the bypass-system is made of pipes with a fillet or chamfer at the outlet region of the impingement section 200*a*. The mixing air is directed to the combustor plenum 501 (referring to the missing items see FIG. 2).

A major advantage referring FIG. 7 consists in the fact that the second zone cooling comprising a highly integrable mechanical junction, in case the combustor liner is built from two mains parts, e.g. combustor liner followed by a sequential liner. This means that the first zone of the cooling section is covering the sequential liner attached to the turbine interface, while the second zone of the cooling section is covering the combustor liner upstream in the hot gas direction. The coolant feeding the interface cooling system, e.g. seal/finger spring with subsequent louver cooling is provided by the downstream branch in hot direction of the second zone cooling system. This provides a very efficient cooling solution of such louver cooling system as a certain heat pick-up of the coolant can be accounted to lower the leakage penalty caused by state of the art purge concepts. Such cooling interface concept allows also manufacturing friendly design solutions as complex system of louver cooling systems can be avoided.

Figure 8:
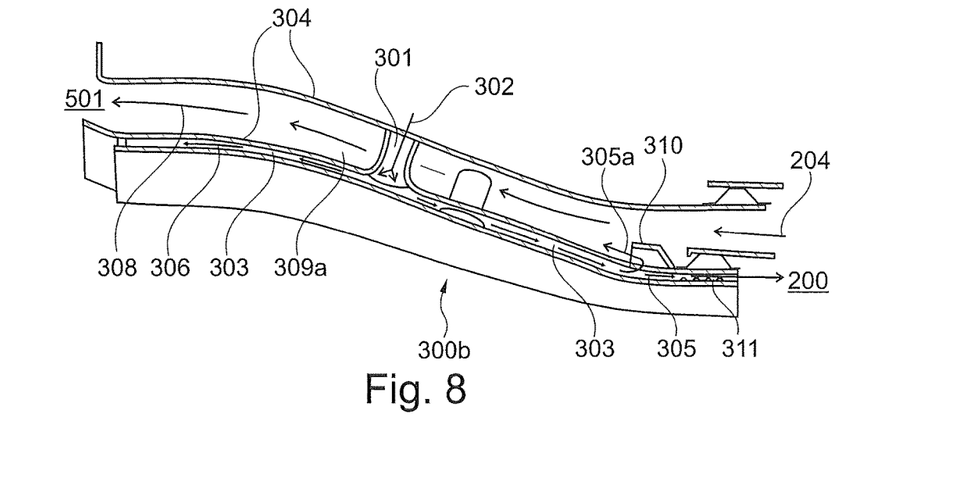
FIG. 8 shows a solution for a parallel cooling scheme for an advanced sequential liner.
Figure 9:
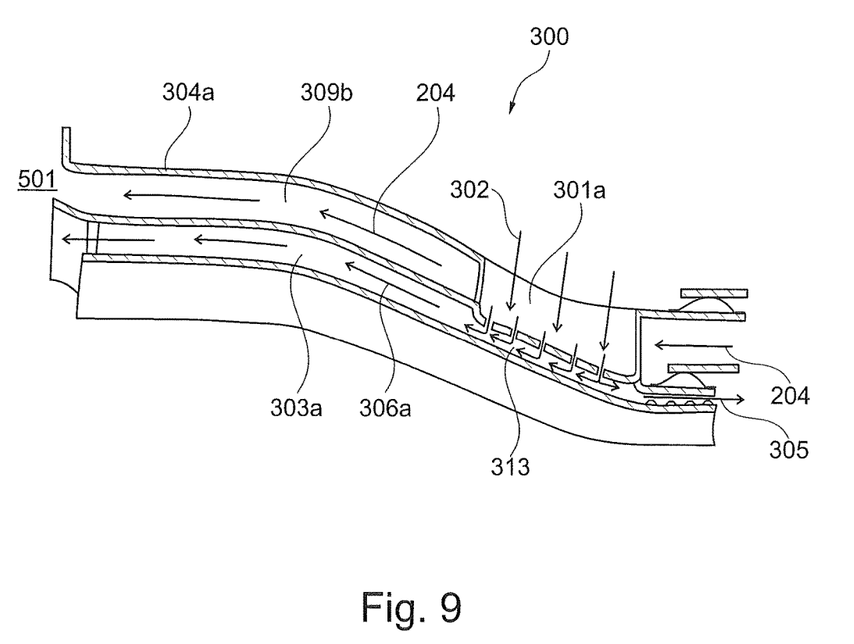
FIG. 9 shows a further solution for a parallel cooling scheme for an advanced sequential liner.

FIGS. 8 and 9 show two additional solutions for the parallel cooling scheme for advanced sequential liners. FIG. 8 shows an additional design sketch of the above described invention (see FIGS. 2 and 7), whereas FIG. 9 shows an alternative concept.

According to FIG. 8 the convective cooling section 300*b* having a first main air inlet system 301 (cylindrical pipes) for introducing an additional cooling air 302 directly to a first air plenum 303 created between a double-walled external liner 304 and the original internal liners 102, wherein the double-walled external liner 304 forms a second mixing air plenum 309*a*. From this air inlet system 301 (cylindrical pipes) a portion the cooling air 302 flows downstream 305 along the first air plenum 303 in the direction of the turbine (not shown), and the remaining air portion flows upstream 306 in the direction of the combustor plenum 501. The air cooling flow 204 from the impingement section (not shown) flow integrally or quasi-integrally along the double-walled external liner 304 towards the combustion plenum 501.

The air cooling flow 305 along the first air plenum 303 is directed to the impingement section 200 and flows through a pin zone 311. A part of the cooling air 305*a* flowed along the air plenum 303 is connected via a branch 310 to the air cooling flow 308 along the air cooling plenum 309*a* (annular plenum). The cooling air 308 is directed to the combustor plenum 501.

Fundamentally, the cylindrical or quasi-cylindrical pipes with radius or chamfer are replaced by pressure-drop impingement cooling pattern (see FIG. 8). The annular plenum accompanies an impingement cooling pattern.

Accordingly, the solution according to FIG. 8 follows the general philosophy to have an upstream and a downstream portion of the parallel air cooling flow to maximize the pressure drop reduction potential.

According to FIG. 9 the convective cooling section 300*c* having a first main air inlet system 301*a* (at least one recess in the circumferentially direction of the external liner 304*a*) for introducing an additional cooling air 302 via an impingement technique 313 directly to a air plenum 303*a* created between an intermediate and an internal liner, wherein both liners form the double-walled internal air liner plenum 303*a* according to a second mixing air plenum 309*a*. The philosophy of the recess air inlet system 301*a*, with respect to the distribution of the cooling air along the below situated air plenum 303*a*, is the same as in the foregoing cylindrical pipes (see FIG. 8). The cooling air 204 is directed to the combustor plenum 501. Accordingly, the solution referring to FIG. 9 follows the general philosophy to have an upstream and a downstream portion of the parallel air cooling flow to maximize the pressure drop reduction potential.

The invention claimed is:

1. A transition piece assembly for a gas turbine comprising:
    a transition piece having one end adapted for connection to a gas combustor and an opposite end adapted for connection to a first turbine stage;
    said transition piece having at least one external liner and at least one internal liner, and the internal liner forms the hot gas flow channel;
    wherein a first section of the transition piece assembly upstream of a first turbine stage having a plurality of cooling apertures;
    wherein cooling medium through the cooling apertures enters a plenum, which is created between external and internal liners and a cooling medium flows along at least the first section of the transition piece assembly;
    wherein at least one second section upstream of the first section with respect to the hot gas flow having at least one additional air inlet system;
    wherein the additional air inlet system of the second section, which comprises at least one internal air plenum and at least one external air plenum, is designed in the manner that the cooling medium is discharged into the internal air plenum created between external and internal liners in two different directions with respect to the hot gas flow, namely one downstream direction towards the turbine and one upstream direction toward the combustor;
    wherein a portion of the cooling medium flows downstream in the direction of a first stage of the turbine, and the remaining portion of the cooling medium flows upstream in the direction of a combustor plenum;
    wherein the cooling medium portion is mixed with a cooling medium flow coming from the first section and the cooling medium mass out of that is directed via external air plenum to the combustor plenum.

2. The transition piece assembly according to claim 1, wherein the first section has an impingement cooling configuration, and the second section has a convective and/or an effusion cooling configuration.

3. The transition piece assembly according to claim 1, further comprising a mixing zone with respect to both cooling medium portions is arranged at the transition between the first section and the second section.

4. The transition piece assembly according to claim 1, wherein the inlet air system consists at least one row of inlet passage pipes distributed in in a circumferential direction of the external liner.

5. The transition piece assembly according to claim 4, wherein the inlet passage pipes are evenly distributed among one another with identical or different diameters or cross sections.

6. The transition piece assembly according to claim 1, wherein the transition piece is built from two main parts, according to an impingement cooling section and a convective cooling section.

7. The transition piece assembly according to claim 6, wherein one or both sections have effusion cooling apertures.

8. A gas turbine comprising a compressor, downstream of the compressor a combustor, whereas the hot gases of the combustor are admitted to a turbine, whereas the combustor operating on the basis of annular or can-combustor architecture, wherein the combustor comprising a transition piece assembly according to claim 1.

9. A gas turbine comprising a compressor, downstream of the compressor a first combustor, whereas the hot gases of the first combustor are admitted to a first turbine, whereas the exhaust gases from the first turbine are admitted to a second combustor, whereas the hot gases of the second combustor are admitted to a second turbine or to a subsequent steam cycle, wherein at least one of the first or second combustor operates on the basis of annular or can-combustor architecture, wherein at least one of the first or second combustor comprises a transition piece assembly according to claim 1.

10. The gas turbine as claimed in claim 9, wherein the first combustor having an annular combustion chamber comprising a plurality of premixing burners or semi-premixing burners, the first turbine connected to receive working gas from the first combustor, the second combustor connected to receive exhausted working gas from the first turbine and to deliver working gas to the second turbine, wherein the second combustor comprises an annular duct forming a combustion space extending in a flow direction from outlet of the first turbine to an inlet of the second turbine, and means for introducing fuel into the second combustor for self-ignition combustion.

11. The gas turbine as claimed in claim 10, wherein the first and/or second combustor operates on the basis of a single can-combustor or on the basis of separated can-combustors.

* * * * *